United States Patent [19]

Thibert et al.

[11] 4,416,434

[45] Nov. 22, 1983

[54] BLADE SECTION FOR ROTATING WINGS OF AN AIRCRAFT

[75] Inventors: Jean-Jacques Thibert; Anne-Marie Rodde, both of Verrieres le Buisson; Jean-Marc E. Pouradier, Port-Saint-Louis-du-Rhone, all of France

[73] Assignees: Societe Nationale Industrielle Aerospatiale; Office National d'Etudes et de Recherches Aerospatiales, both of France

[21] Appl. No.: 293,683

[22] Filed: Aug. 17, 1981

[30] Foreign Application Priority Data

Sep. 24, 1980 [FR] France ................................ 80 20490

[51] Int. Cl.³ ............................................... B64C 3/10
[52] U.S. Cl. .............................. 244/35 R; 416/223 R; 416/242
[58] Field of Search ........................ 244/17.11, 35 R; 416/DIG. 2, 223 R, 242

[56] References Cited

U.S. PATENT DOCUMENTS

| 2,123,096 | 7/1938 | Charpentier | 244/35 R |
| 2,628,043 | 2/1953 | Montgomery | 244/35 R |
| 4,142,837 | 3/1979 | de Simone | 416/223 R |
| 4,314,795 | 2/1982 | Dadone | 416/223 R |

FOREIGN PATENT DOCUMENTS

| 37633 | 10/1981 | European Pat. Off. | 416/223 R |
| 2803041 | 8/1979 | Fed. Rep. of Germany | 244/35 R |

OTHER PUBLICATIONS

Hicks et al., "Effects of Forward Contour Mod. on the Aero. Characteristics of the NACA 64, -212 Airfoil Sec.", NASA TMX-3293, Sep. 1975.

Primary Examiner—Galen L. Barefoot
Attorney, Agent, or Firm—Merriam, Marshall & Bicknell

[57] ABSTRACT

The present invention relates to a blade section for rotating wings of an aircraft comprising, between the leading edge and the trailing edge, a convex lower surface and an upper surface which is convex over the greater part of its length, but concave near the trailing edge. According to the invention, the upper surface of the section comprises a region of small extent, close to the leading edge but not contiguous thereto, in which the curvature is substantially constant. The invention is applicable to the improvement of the performances in maneuvering flight, while hovering and in advance flight of the aircraft.

14 Claims, 9 Drawing Figures

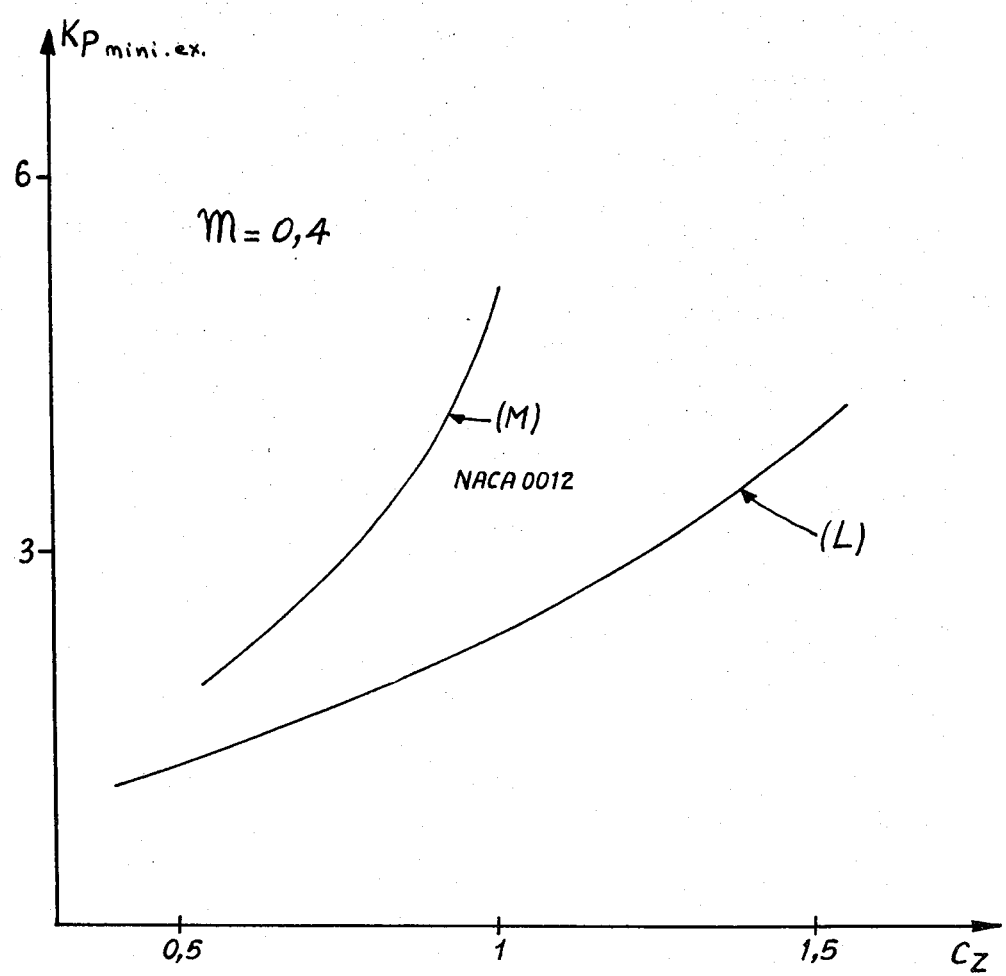

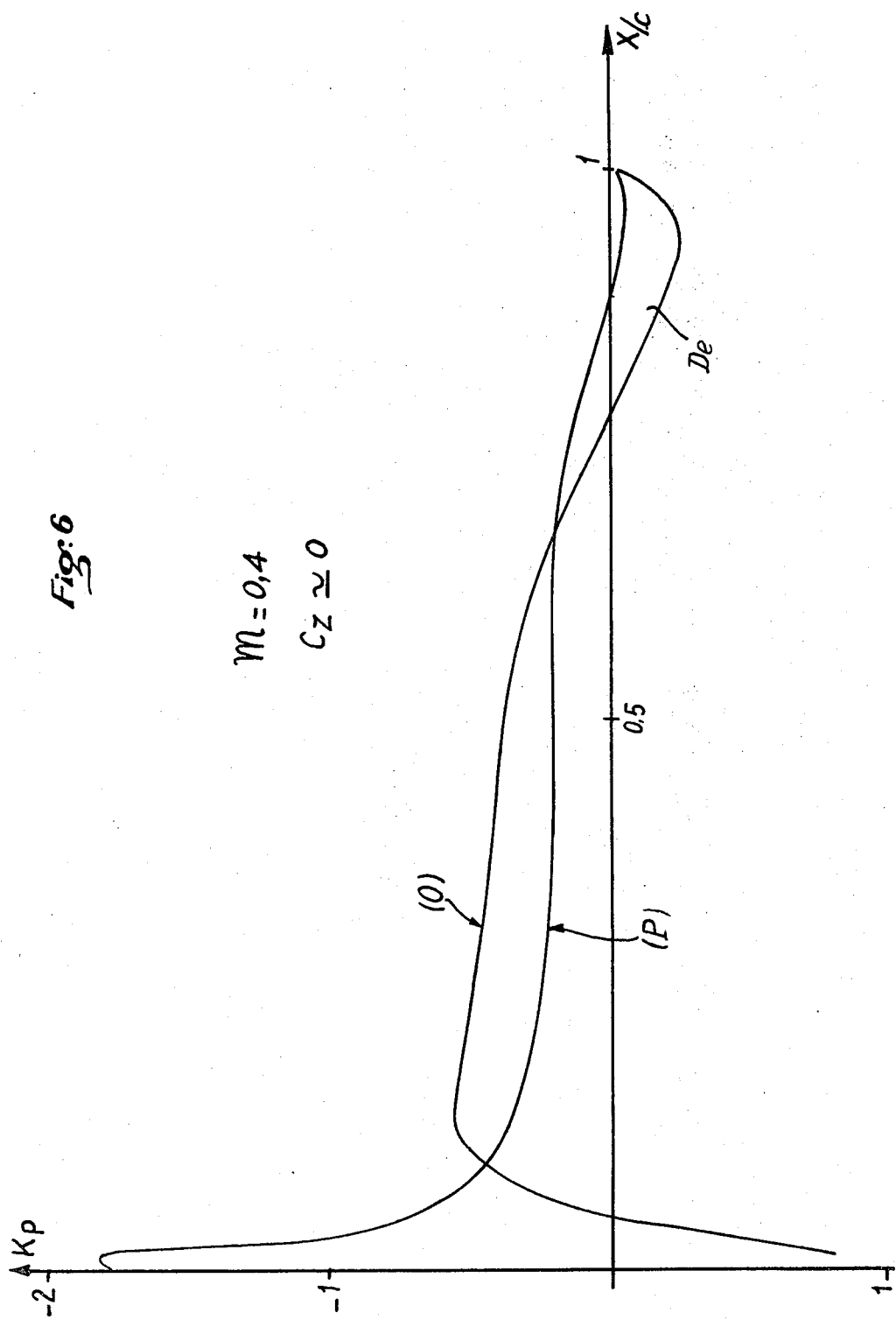

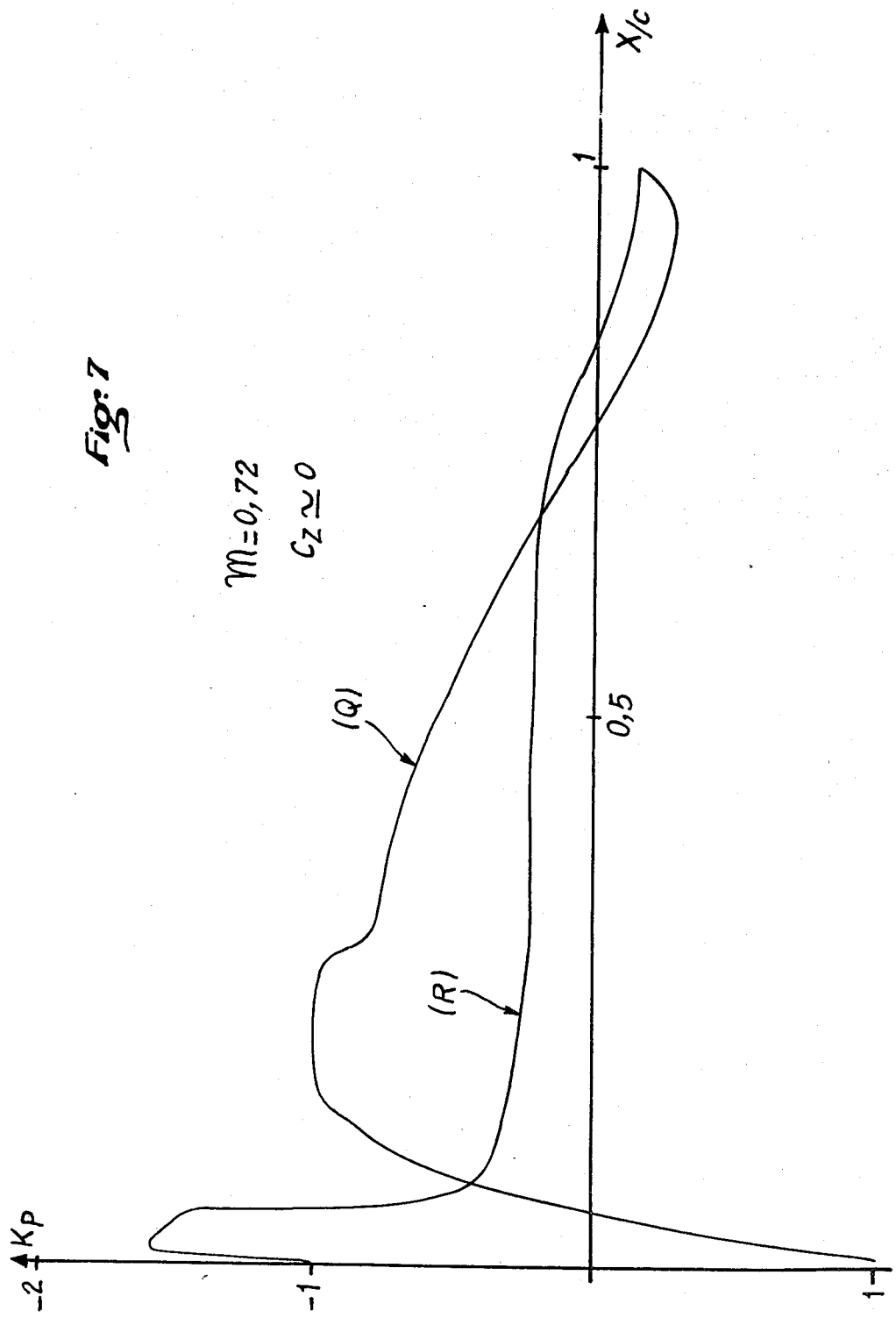

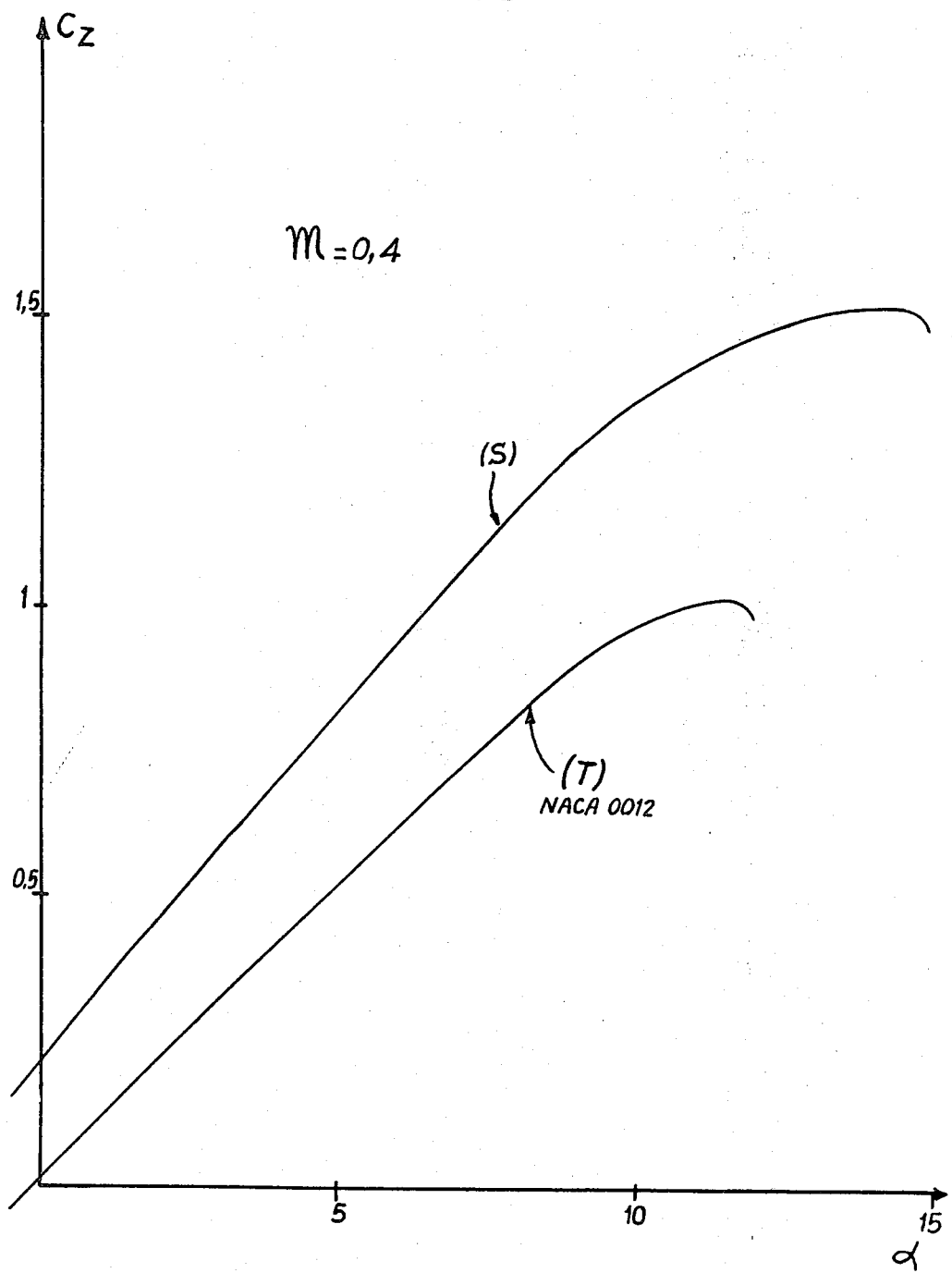

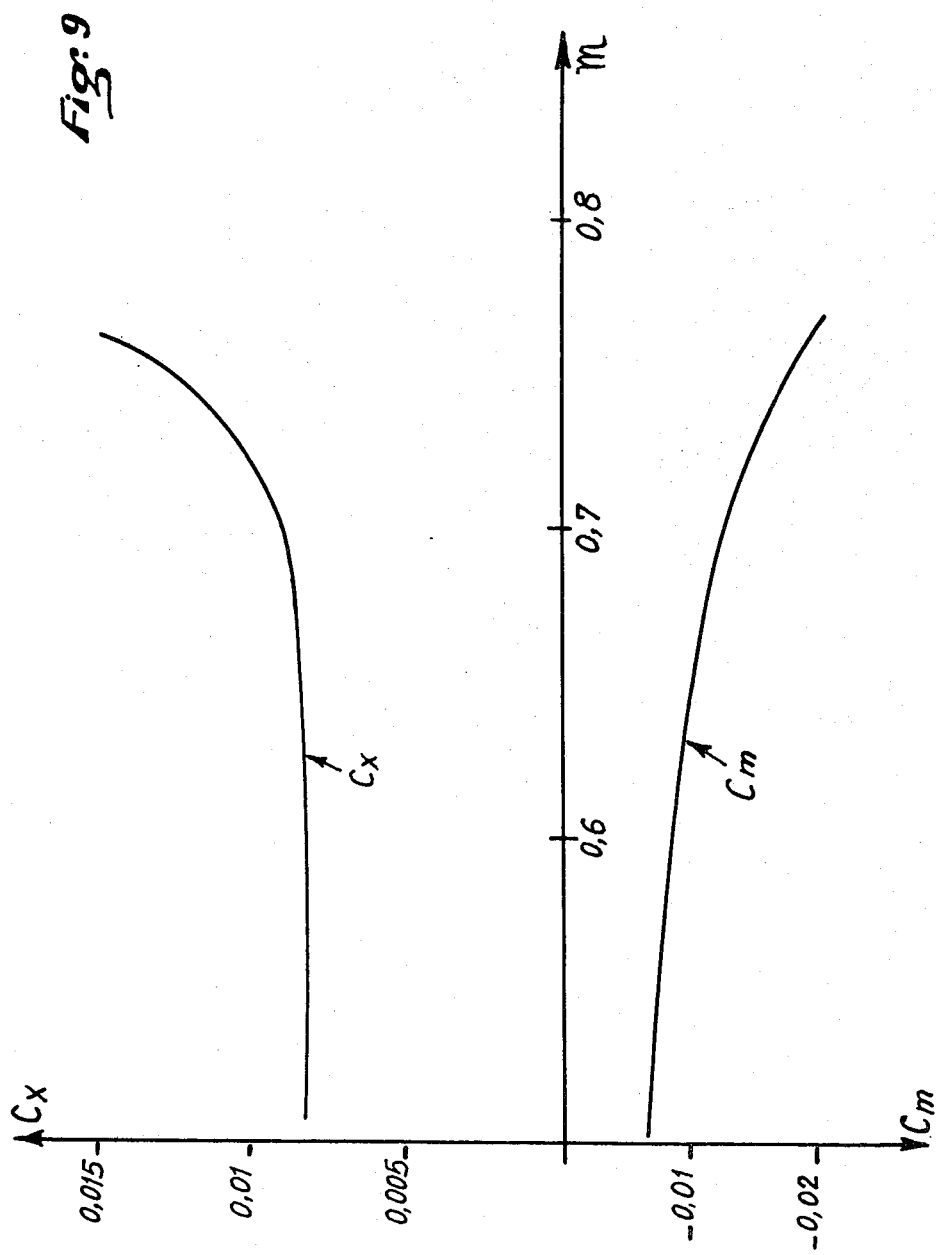

BLADE SECTION FOR ROTATING WINGS OF AN AIRCRAFT

The present invention relates to a blade for the rotating wings of an aircraft and, more particularly, to a helicopter wing blade airfoil or section.

It is known that, for helicopter blades, the composition of the speeds of rotation and of advance produces, on the advancing blade side (angle of bearing varying from 0° to 180°), relative Mach numbers varying from about 0.2 at the root to 0.85 at the tip of the blade, and, on the retreating blade since (angle of bearing varying from 180° to 360°), much lower Mach numbers ranging from 0.4 at the blade tip to 0, and even to negative values (sections where the trailing edge becomes the leading edge), in the circle of inversion near the hub. These Mach number values are, of course, only given by way of indication since they depend on the speed of rotation of the rotor and of advance of the apparatus.

Therefore, to maintain equilibrium of the apparatus in roll, the value of the coefficient of lift $C_z$ and consequently that of the incidence, must be low for the advancing blade and high for the retreating blade. The blades, in the course of a rotation, are therefore alternately subjected to low incidences and to high speeds, then to high incidences and to moderate speeds. The Mach number and incidence levels encountered by a blade section being a function of the position of said section spanwise, optimization of the rotor performances leads to using a blade with spanwise tapering section.

Thus, for the sections located near the tip of the blade, for which the Mach numbers are highest, sections having a high drag divergence Mach number are preferably used for the low lift levels in order to reduce the drag of the rotor; on the contrary, for the blade sections close to the root, the sections must have high maximum lift coefficients at moderate Mach numbers, in order to avoid retreating blade stall. Moreover, an imperative exists for helicopter blade sections, which is to obtain the lowest possible zero lift moment coefficient $C_{mo}$, in order to avoid the vibrations and high alternate efforts in the rotor pitch control channel which may be detrimental to its service life.

A means currently used for obtaining high maximum lift coefficients is to define a section of which the centre line of framework has a considerable camber; however, a considerable camber of the framework leads to high moment coefficients $C_{mo}$ and the performances of such sections are mediocre for high Mach numbers, such as those encountered in advancing blades.

It is an object of the present invention to provide a section which is particularly well adapted at least for the sections of the blade included between the root and about 75% of the span, and which enables the phenomenon of retreating blade stall to be delayed without reducing the advancing blade performances, thus giving the rotor improved performances during manoeuvring flight, hovering or advancing flight of the helicopter.

The particular geometry of said section, particularly marked by the presence of numerous local features, gives this section noteworthy values of the maximum lift coefficient for Mach numbers of between 0.3 and 0.5, obtained jointly with very low values of the zero lift moment coefficient $C_{mo}$, up to Mach numbers of 0.75, without resorting to artificial means such as trailing edge stabilisers which, deflected to reduce the value $C_{mo}$, increase the drag coefficient of the section and reduce thhe maximum lift thereof.

To this end, according to the invention, a blade section for rotating wings of an aircraft comprising, between the leading edge and the trailing edge, a convex lower surface and an upper surface which is convex over the greater part of its length, but concave near the trailing edge, the upper surface comprising a first zone, extending from the leading edge up to at the most 30% of the length of the chord in the direction of the trailing edge, in which the curvature decreases rapidly and a second zone, following said first zone in the direction of the trailing edge and extending up to at least 60% of the length of the chord from the leading edge, in which the curvature undergoes little variation, is noteworthy in that, in said first zone, the upper surface comprises a region of small extent, close to the leading edge, but not contiguous thereto, in which the curvature is substantially constant.

This particularity of a slight step in the rapid decrease of the curvature of the upper surface from the leading edge enables overspeeds on the upper surface to be controlled and the increase of the overspeed on said upper surface to be minimised, when the lift increases, thus avoiding a separation of the boundary layer and consequently enabling remarkable values to be obtained for the maximum lift coefficient.

This region of the upper surface with substantially constant curvature encompasses the point of the upper surface of which the projection on the chord is at a distance from the leading edge equal to 1% of the length of said chord. It may extend in projection on the chord of the section, over a length at the most equal to 1% of the length of said chord, and be centred about a point of which the projection on the chord is at a distance from the leading edge at least equal to 0.5% of the length of said chord. In this region of the upper surface with substantially constant curvature, the curvature may be about five times smaller than at the leading edge.

Thus, in an embodiment of the blade according to the invention having a relative maximum thickness of between about 11 and 15%, the upper surface of the section comprises such a first zone extending from the leading edge up to about 20% of the length of the chord in the direction of the trailing edge and constituted by a first region going from the leading edge, where the curvature is maximum and chosen as base equal to 100, up to less than 1% of the length of the chord, by a second region disposed on either side of the point of the chord disposed at 1% of the length of the chord from the leading edge and in which the curvature is constant and close to 20, and by a third region following the second and in which the curvature decreases from this value close to 20 up to a value close to 1, said first zone being followed by a second zone extending up to about 70% of the length of the chord from the leading edge and in which the curvature is substantially constant and close to 1.

This second zone of the upper surface is followed by a third zone, itself constituted by a first region extending up to about 80% of the length of the chord and in which the curvature decreases from said value substantially close to 1 to 0, by a second region extending up to about 97% of the length of the chord and in which the curvature continues to decrease from 0 to about $-5$, and by a third region going up to the trailing edge and in which the curvature increases from about $-5$ to 0.

In said third zone, the upper surface therefore presents a reversal of curvature, resulting in the concavity of the rear part of the upper surface, provoking the appearance, at low lift levels, of a zone of negative lift which enables very low values of the moment coefficient $C_{mo}$ to be obtained.

The particular distribution of the curvatures on the upper surface of the section, in the region of the leading edge and in the region of the trailing edge, therefore enables remarkable values of the $C_{z\ max}$ and low values of $C_{mo}$ to be jointly obtained, without having to resort to artificial means such as trailing edge stabilizers which deteriorate the performances of the sections.

To give said section good performances in the sector of the advancing blade, i.e. with low $C_z$ and high Mach number, in addition to the noteworthy values of the $C_{z\ max}$ and of the $C_{mo}$, the section according to the invention has a convex lower surface which comprises a first zone going from the leading edge to a distance from said leading edge, along the chord, equal to about 1.5% of the length of the chord, in which the curvature decreases continuously from a maximum value chosen as base equal to 100 at the leading edge to a value close to 10 at the end of this zone, followed by a second zone in which the curvature also decreases, but less rapidly than in said first zone and which extends up to about 10% of the length of the chord where the curvature reaches a value close to 1. Said first zone of upper surface curvature limits the level of the overspeed on the lower surface of the section at low lift levels, whilst said second zone, makes it possible, at high Mach numbers, to obtain a recompression of the flow, after the overspeed such recompression avoiding the formation of intense shock wave, thus giving the section a low drag level and a high drag divergence Mach number value, at low lift level. Said second zone of lower surface curvature is followed by a third zone extending up to about 95% of the length of the chord, in which the curvature is substantially constant and very small. This third zone of small curvature avoids the appearance of considerable recompression gradients, thus contributing to obtaining the low drag level of the section.

For reasons of local control of the flow and of construction, said third lower surface zone is followed by a fourth zone extending substantially over 5% of the chord, up to the trailing edge, in which the lower surface is rectilinear and substantially parallel to the corresponding part of the upper surface, the section thus having a substantially constant thickness equal to 0.4% of the chord, in the vicinity of the trailing edge.

In order to be able to define and easily produce the section according to the invention, the upper surface and lower surface may be defined with the aid of analytical formulae enabling the numerous particular geometric characteristics of said section to be reproduced.

To this end, in a system of orthogonal axes OX, OY of which the origin 0 is merged with the leading edge, of which axis OX is merged with the chord and oriented positively from the leading edge to the trailing edge and of which axis OY is oriented positively from the lower surface towards the upper surface, and for a relative thickness of 13%, the upper surface may be defined by the following relationships where X is the abscissa, Y the the ordinate, C the chord and x the ratio X/C:

from $X/C = 0$ to $X/C = 0.049$ $$Y/C = 0.1745 \sqrt{x} + 1.1591\ x - 79.589\ x^2 + 344.71\ x^3 - 6{,}875.8\ x^4 + 504140\ x^5$$

from $X/C = 0.049$ to $X/C = 0.109$ $$Y/C = -0.007614 \sqrt{x} + 1.8218\ x - 15.255\ x^2 + 18.514\ x^3 + 682.97\ x^4 - 4{,}522.9\ x^5 + 8{,}498.4\ x^6$$

from $X/C = 0.109$ to $X/C = 0.285$ $$Y/C = 0.24914 \sqrt{x} + 0.10962\ x - 1.2684\ x^2 - 0.85335\ x^3 + 15.34\ x^4 - 25.295\ x^5$$

from $X/C = 0.285$ to $X/C = 1$ $$Y/C = 0.02173 + 0.34949 \sqrt{x} - 0.17603\ x - 0.26659\ x^2 + 0.03833\ x^3 + 0.14407\ x^4 - 0.14359\ x^5 + 0.68569\ x^6 - 1.4592\ x^7 + 0.84737\ x^8$$

In the same system of axes, the following relationships will be used for the lower surface, still for a relative thickness of 13%:

from $X/C$ from 0 to 0.503

$$Y/C = 0.11589 \sqrt{x} + 0.15852\ x - 0.13218\ x^2 - 0.72686\ x^3 + 3.4824\ x^4 - 5.4712\ x^5 + 3.0192\ x^6$$

from $X/C$ from 0.503 to 1

$$Y/C = -0.044809 + 0.073457 \sqrt{x} - 0.040754\ x - 0.11866\ x^2 - 0.12597\ x^3 + 0.591\ x^4 - 0.34067\ x^5$$

The different mathematical relationships mentioned hereinabove are, of course, valid for a unitary chord.

Thus, due to the invention, rotating wings of aircraft which have particularly good performances may be obtained. It will be noted that it is not indispensable, in order to obtain the favourable effects mentioned, that the whole of each blade of the rotating wings has the section according to the invention. The principal point is that the inner section of the blade presents the section according to the invention. For example, for rotating wings having a radius equal to R, it is generally sufficient that the inner section of the blade between the root and 0.75 R be in accordance with the invention. If all the blade presents the section according to the invention, an aircraft capable of carrying heavy loads is obtained.

Furthermore, sections of relative thicknesses close to 13% may be obtained, also having good performances, i.e. high maximum $C_z$ for Mach numbers of between 0.3 and 0.5, low $C_{mo}$ and high maximum $C_z$ for Mach numbers of between 0.3 and 0.5, low $C_{mo}$ and high drag divergence Mach numbers with low $C_z$, from the ordinates of the section of 13% described previously. Thus, for a range of relative thicknesses varying from 11 to 15%, high-performance sections may be obtained by multiplying the ordinates $Y/C$ of the section of 13% deduced from the preceding formulae by the ratio of the desired relative thickness of 0.13.

The invention will be more readily understood on reading the following description with reference to the accompanying drawings, in which:

FIG. 5 is a diagram illustrating the development of the minimum pressure coefficient on the upper surface $k_{p\,mini.ex}$ as a function of the lift coefficient $C_z$, at a Mach number equal to 0.4, for the section according to the invention (curve L) and for the known NACA 0012 section (curve M).

FIG. 6 is a diagram showing the distribution of pressure (coefficient $K_p$) along the upper surface (curve O) and the lower surface (curve P) of the section according to the invention, for a Mach number of 0.4 and a zero lift coefficient C.

FIG. 7 is a diagram showing the distribution of pressure (coefficient $K_p$) along the upper surface (curve Q) and the lower surface (curve R) of the section according to the invention, for a Mach number 0.72 and a zero lift coefficient $C_z$.

FIG. 8 is a diagram showing the development of the lift coefficient $C_z$ as a function of the incidence $\alpha$ for the section according to the invention (curve S) and for the known NACA 0012 section (curve T), for a Mach number equal to 0.4.

FIG. 9 is a diagram illustrating the developments of the drag coefficient $C_x$ and of the moment coefficient $C_m$ of the section according to the invention, as a function of the Mach number M, for a low lift coefficient $C_z$.

Figure 1:
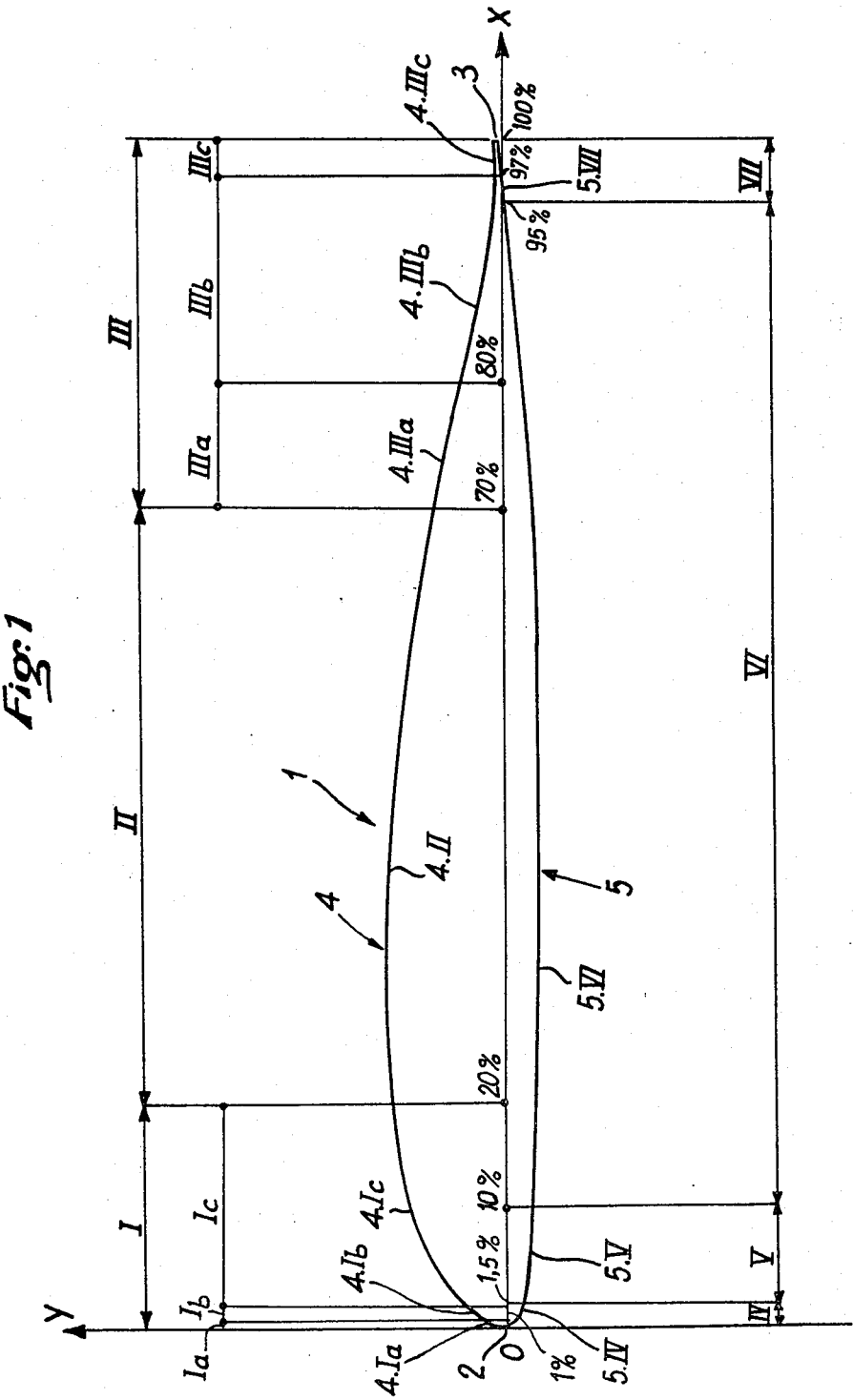
FIG. 1 is a general view of the blade section according to the invention.

Referring now to the drawings, the section 1 according to the invention, shown in FIG. 1, comprises between its leading edge 2 and its trailing edge 3 an upper surface 4 which is convex in the major part thereof, but concave towards the trailing edge 3, and a convex lower surface 5.

To facilitate the description, the section 1 according to the invention is referenced to a system of orthogonal axes OX,OY, of which the origin O is merged with the leading edge 2, the axis OX is merged with the chord of the section and oriented positively from the leading edge 2 towards the trailing edge 3 and of which the axis OY is oriented positively from the lower surface towards the upper surface. On these axes OX and OY are carried the reduced coordinates of the section, i.e. referenced to the length C of the chord.

Figure 2:
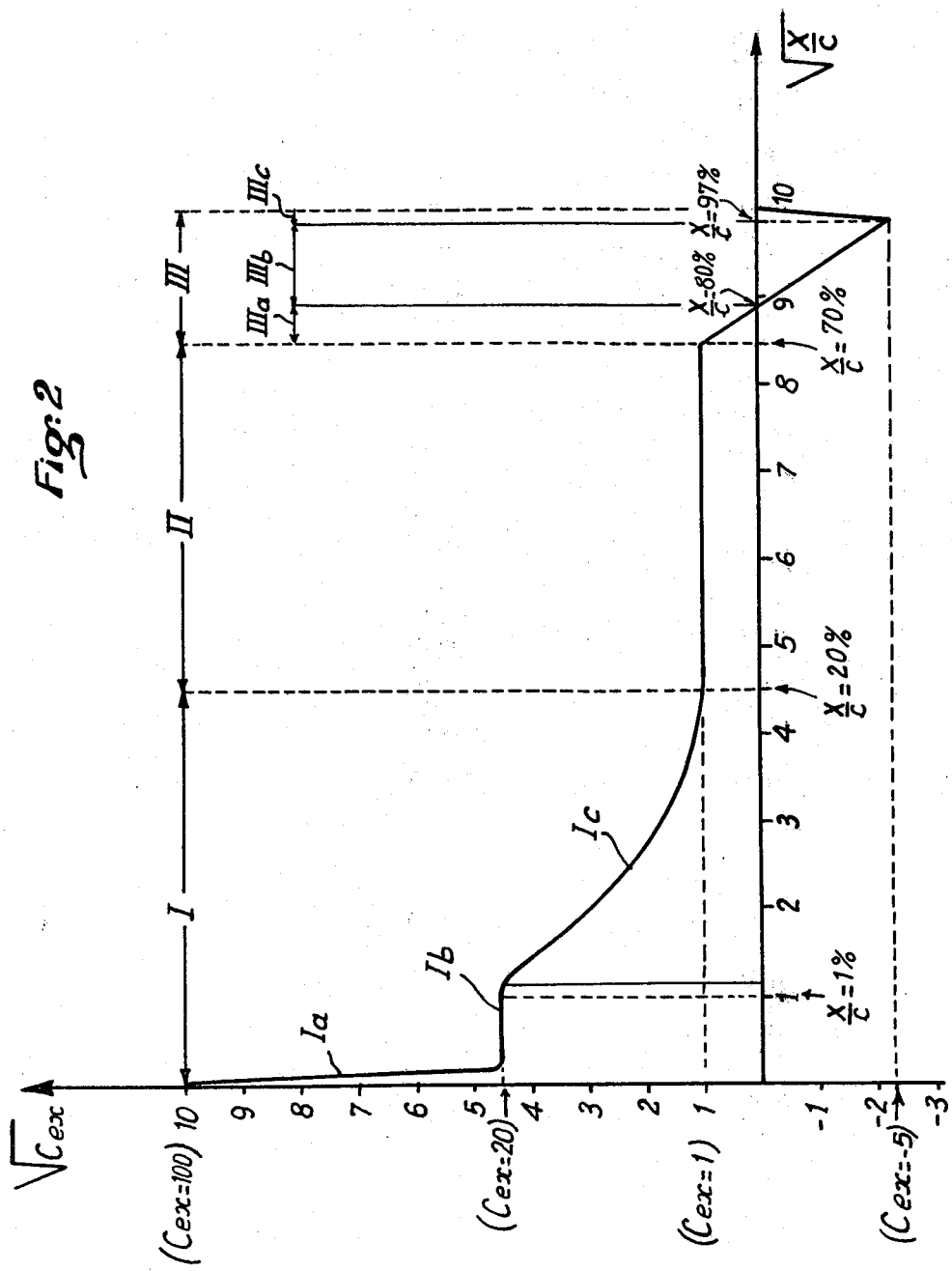
FIG. 2 is a diagram giving the variation of the curvature of the upper surface $C_{ex}$ as a function of the reduced x-axis X/C along the chord. For reasons of reproduction, the diagram of FIG. 2 bears on the x-axis the square root of the reduced x-axis X/C and on the y-axis the square root of the curvature $C_{ex}$.

As shown in FIGS. 1 and 2, the upper surface 4 of the section 1 comprises three zones of curvatures I, II and III.

The first zone I, which begins (cf. also FIG. 4) at the leading edge 2 (O) where the curvature is chosen as base equal to 100, comprises three consecutive regions Ia, Ib and Ic. The first region Ia extends from said leading edge up to a point of the chord of which the reduced x-axis is close to 0.2%. In this first region Ia, the curvature $C_{ex}$ of the portion of upper surface 4.Ia decreases rapidly from value 100 to a value equal to 20. The first region Ia is followed by the second region Ib of the first zone I. This second region Ib extends between the points of the chord of which the reduced x-axes are approximately 0.2% and 1.2% and the curvature $C_{ex}$ of the portion of upper surface 4.Ib is substantially constant and close to 20. Finally, the second region Ib is followed by the third region Ic extending up to a reduced x-axis of about 20% and in which the curvature $C_{ex}$ of the portion of upper surface 4.Ic diminishes from value 20 to a value close to 1.

Due to the geometrical characteristics of the portions of upper surface 4.Ia, 4.Ib and 4.Ic of the first zone I, values of the minimum pressure coefficient $K_{P.mini.ex}$ much lower, in absolute value, than those obtained with another known section, are obtained on the upper surface of the section, for Mach numbers lower than or equal to 0.5, as a function of the lift coefficient $C_z$, as shown by FIG. 5 for a Mach number of 0.4. This low overspeed makes it possible considerably to delay the appearance of separation of the boundary layer and to obtain noteworthy values of the maximum $C_z$, as shown in FIG. 8 which shows the curves of variation of the lift coefficient $C_z$ as a function of the incidence measured in the wind tunnel under the same conditions, for the section according to the invention (curve S) and another conventional section used on helicopters.

The first zone I of curvature of the upper surface is followed by a second zone II extending between 20% and 70% of the chord and in which the curvature $C_{ex}$ of the portion of upper surface C.II presents a substantially constant value equal to 1.

In the region of the trailing edge 3, the curvature $C_{ex}$ is defined by a third zone III, going from 70% of the chord to said trailing edge and subdivised into three regions IIIa, IIIb and IIIc. In the first region IIIa which extends up to about 80% of the chord, the curvature $C_{ex}$ of the portion of upper surface 4.IIIa passes from value 1 to value 0. In the second region IIIb, consecutive to region IIIa, and extending up to 97% of the chord, the curvature $C_{ex}$ of the portion of upper surface 4.IIIb is negative and decreases from 0 to about −5. Finally, in the third region IIIc, the curvature $C_{ex}$ of the portion of upper surface 4.IIIc remains negative, but increases from −5 up to 0 at the trailing edge 3.

Figure 3:
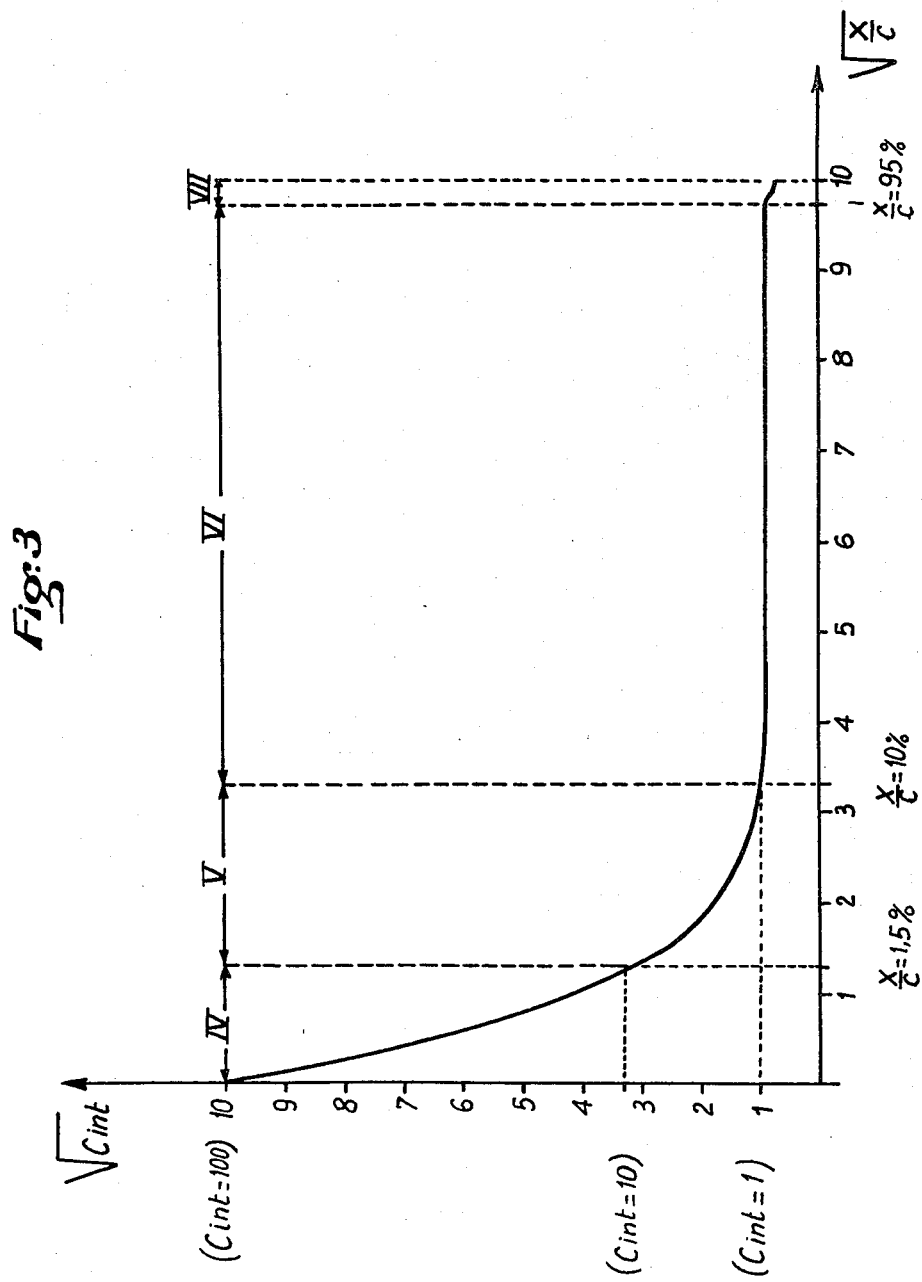
FIG. 3 is a diagram giving the variation of the curvature of the lower surface $C_{int}$ as a function of the reduced x-axis X/C along the chord. For reasons of reproduction, the diagram of FIG. 3 bears on the x-axis the square root of the reduced x-axis X/C and on the y-axis the square root of the curvature $C_{int}$.
Figure 4:
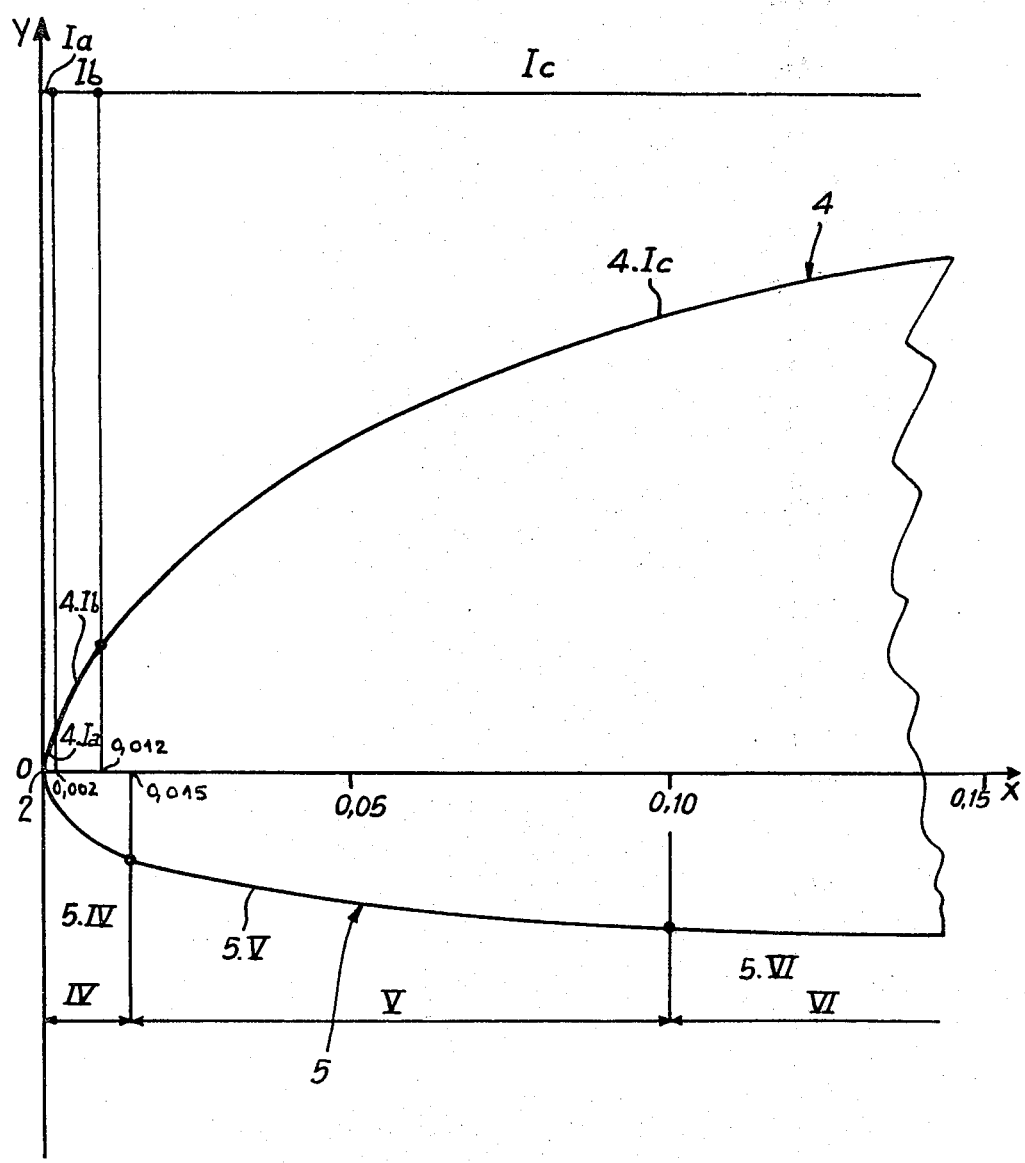
FIG. 4 is an enlarged view of the vicinity of the leading edge of the section of FIG. 1.

Furthermore, as shown in FIGS. 1,3 and 4, the line of lower surface 5 of the section 1 comprises four consecutive regions of curvature IV, V, VI and VII, corresponding respectively to the four portions of lower surface 5.IV, 5.V, 5.VI and 5.VII.

To give the section 1 a high drag divergence Mach number at low $C_z$ and a low drag coefficient $C_x$, the lower surface 5 of the section according to the invention has a line 5.IV extending from the leading edge 2 to a point located at 1.5% of the chord, of which the curvature $C_{int}$ decreases from value 100 to a value close to 10, followed by line 5.V continuing up to 10% of the chord; the curvature $C_{int}$ of the line 5.V decreases in the direction of the trailing edge, but less rapidly than for line 5.IV, the value of the curvature $C_{int}$ at the end of the region IV being close to 1. This line 5.V is followed by the line 5.VI extending up to 95% of the chord and presenting a small, substantially constant curvature.

This particular geometry of the lower surface 5 of the section 1, associated with the geometry of the portion 4.II of the upper surface 4, of which the curvature is substantially constant and close to 1, makes it possible perfectly to control the fluid flow around the section 1 at high Mach numbers and in particular to reduce the overspeed on the lower surface and the intensity of the recompression shock wave which is generally located on the portion 5.V of lower surface, as well as the intensity of the shock wave on the upper surface located on the portion 4.II of said upper surface for operational Mach numbers of between 0.7 and 0.8, Mach numbers encountered by the advancing blade of the rotating wings.

Furthermore, the lower surface 5 comprises in the region of the trailing edge 3 the line 5.VII (region VII) extending between 95% of the chord from the leading edge 2 and the trailing edge 3. The curvature $C_{int}$ of the portion of upper surface 5.VII is small and substantially constant.

The portions 4.IIIb, 4IIIc of the upper surface and the portion 5.VII of the lower surface give a particular geometry to the region of the trailing edge, with reversal of curvature of the upper surface and constancy of the thickness of the section between 95% of the chord and the trailing edge 3. This constant thickness may be equal to 0.4% of the length C of the chord.

This particular geometry near the trailing edge makes it possible to obtain a zone of negative lift De at the rear of the section 1, as shown in FIG. 6 which shows the distribution of the pressures (coefficient $K_p$) measured around the section for a Mach number of 0.4 and a low level of lift, which negative lift zone enables very low moment coefficients to be obtained.

Thus, the particular geometries of the section 1 in the vicinity of the leading edge 2 and the trailing edge 3 make it possible jointly to obtain noteworthy values for the maximum lift coefficient $C_z$ and low values for the real lift moment coefficient $C_{mo}$.

FIG. 7 which shows the distribution of the pressures (coefficient $K_p$) around the section according to the invention for a Mach number of 0.72 and a low lift coefficient, clearly shows that the overspeed on the lower surface is low and that the intensities of the shock waves on the upper surface and the lower surface are moderate, this giving the section a high drag divergence Mach number and a low level of $C_x$, the particular geometry of the trailing edge further ensuring a low moment level $C_m$ even at high Mach numbers.

FIG. 9 clearly illustrates the good functioning of the section at transsonic speed, both from the standpoint of drag and of the value of the moment coefficient $C_m$.

Comparative tests made under the same conditions have shown noteworthly results with respect to a conventional reference section NACA 0012. For example, the maximum lift coefficients $C_z$ at $M_o=0.4$ and $M_o=0.5$ are increased by 50% (cf. FIG. 8). Furthermore, the drag divergence Mach number at zero lift is 0.755 and the level of $C_m$ for a $C_z$ adjacent to 0 does not exceed $-0.015$ for upstream Mach numbers lower than or equal to 0.73 (cf. FIG. 9).

The excellent performances of this section guarantee high performances in flight particularly when manoeuvring and hovering.

The section according to the invention therefore enables a high performance blade to be defined, applicable to all types of aircraft rotors, such as helicopters.

The equations given hereinabove for a section of maximum relative thickness equal to 13% enable any section according to the invention of which the maximum relative thickness is between 11 and 15% to be easily outlined, by multiplication of the ordinates by the ratio of the desired maximum relative thickness at 0.13.

What is claimed is:

1. A blade section for a helicopter rotor blade comprising the leading edge and the trailing edge, a convex lower surface and an upper surface which is convex over the greater part of its length, but concave near the trailing edge, the upper surface comprising:
  a first zone extending from the leading edge to not more than 30% of the length of the chord in the direction of the trailing edge,
  said first zone comprising:
  a first region in which the curvature of the surface has a maximum value at the leading edge and decreases rapidly toward the trailing edge;
  a second region adjacent said first region in which the curvature is substantially constant, and
  a third region adjacent said second region and extending to not more than 30% of the chord from the leading edge in which the radius of curvature decreases rapidly;
  and a second zone adjacent said first zone and extending to at least 60% of the length of the chord from the leading edge in which the curvature of the upper surface is substantially constant.

2. The section of claim 1, wherein said second region encompasses the point on the upper surface whose projection on the chord of the section is at a distance from the leading edge equal to 1% of the length of the chord.

3. The section of claim 1, wherein said second region extends, in projection on the chord of the section, over a length at least equal to 1% of the length of said chord.

4. The section of claim 1, wherein said second region is centred at a point whose projection on the chord of the section is at a distance from the leading edge at least equal to 0.5% of the length of said chord.

5. The section of claim 1, wherein, in said second region, the curvature is about one-fifth that at the leading edge.

6. The section of claim 1, having a maximum relative thickness between about 11 and 15%, wherein said first zone extends from the lading edge to about 20% of the length of the chord in the direction of the trailing edge,
  said first region extends from the leading edge, where the curvature is maximum and chosen as base equal to 100, to less than 1% of the length of the chord,
  said second region is disposed on either side of a point of the chord located at 1% of the length of the chord from the leading edge and has a constant curvature of about 20,
  said third region has a curvature which decreases from about 20 to about 1, and
  said second zone extends to about 70% of the length of the chord from the leading edge and has a curvature substantially equal to 1.

7. The section of claim 6, wherein said second zone is followed by a third zone comprising
  a first region extending to about 80% of the length of the chord in which the curvature decreases from about 1 to 0,
  a second region extending to about 97% of the length of the chord in which the curvature decreases from 0 to about $-5$, and
  a third region extending to the trailing edge in which the curvature increases from about $-5$ to 0.

8. The section of claim 6, wherein
  said convex lower surface comprises a first zone extending from the leading edge a distance along the chord equal to 1.5% of the length of the chord, in which the curvature decreases continuously from a maximum value chosen as base equal to 100 at the leading edge to about 10, and a second zone adjacent said first zone and extending to about 10% of the chord in which the curvature decreases from about 10 to about 1.

9. The section of claim 8, wherein said second zone of curvature of the lower surface is followed by a third zone extending to about 95% of the length of the chord, in which the curvature is substantially constant and very small.

10. The section of claim 9, wherein said third zone of the lower surface is followed by a fourth zone extending substantially to the trailing edge, in which the lower surface is rectilinear and substantially parallel to the corresponding part of the upper surface.

11. The section of claim 10, wherein, near the trailing edge, the section has a constant thickness substantially equal to 0.4% of the chord.

12. The section of claim 6, referenced to a system of orthogonal axes OX, OY of which the origin 0 is merged with the leading edge, of which the axis OX is merged with the chord and oriented positively from the leading edge towards the trailing edge and of which the axis OY is oriented positively from the lower surface towards the upper surface, wherein its upper surface is defined by the following relationships, in which C is the length of the chord and x the ratio X/C:

from $X/C = 0$ to $X/C = 0.049$, $$Y/C = 0.1745 \sqrt{x} + 1.1591 x - 79.589 x^2 + 344.71 x^3 - 6,875.8 x^4 + 504140 x^5$$

from $X/C = 0.049$ to $X/C = -.109$, $$Y/C = -0.007614 \sqrt{x} + 1.8218 x - 15.255 x^2 + 18.154 x^3 + 682.97 x^4 - 4,522.9 x^5 + 8,498.4 x^6,$$

-continued from $X/C = 0.109$ to $X/C = 0.285$, $$Y/C = 0.24914 \sqrt{x} + 0.10962 x - 1.2684 x^2 - 0.85335 x^3 + 15.34 x^4 - 25.295 x^5,$$

from $X/C = 0.285$ to $X/C = 1$, $$Y/C = -0.02173 + 0.34949 \sqrt{x} - 0.17603 x - 0.26659 x^2 + 0.03833 x^3 + 0.14407 x^4 - 0.14359 x^5 + 0.68569 x^6 - 1.4592 x^7 + 0.84737 x^8.$$

13. The section of claim 6, presenting a maximum relative thickness of 13% and referenced to a system of orthogonal axes OX, OY of which the origin 0 is merged with the leading edge, of which the axis OX is merged with the chord and oriented positively from the leading edge towards the trailing edge and of which the axis OY is oriented positively from the lower surface towards the upper surface, wherein its lower surface is defined by the following relationships in which C is the length of the chord and x the ratio X/C:

from $X/C$ from 0 to 0.503

$$Y/C = -0.11589 \sqrt{x} + 0.15852 x - 0.13218 x^2 - 0.72686 x^3 + 3.4824 x^4 - 5.4712 x^5 + 3.0192 x^6$$

from $X/C$ from 0.503 to 1

$$Y/C = -0.044809 + 0.073457 \sqrt{x} - 0.040754 x - 0.11866 x^2 - 0.12597 x^3 + 0.591 x^4 - 0.34067 x^5$$

14. A helicopter rotor blade, wherein at least 75% of the length of the blade from its root has a section as specified in any one of claims 2, 3, 4, 5, 6, 7, 8, 9, 10, 11, 12 or 13.

* * * * *

UNITED STATES PATENT AND TRADEMARK OFFICE
CERTIFICATE OF CORRECTION

PATENT NO. : 4,416,434
DATED : November 22, 1983
INVENTOR(S) : JEAN-JACQUES THIBERT ET AL.

It is certified that error appears in the above-identified patent and that said Letters Patent are hereby corrected as shown below:

Column 8, line 42, "lading" should be --leading--.

Signed and Sealed this

Fifth Day of June 1984

[SEAL]

Attest:

GERALD J. MOSSINGHOFF

*Attesting Officer*     *Commissioner of Patents and Trademarks*